Patented Oct. 4, 1938

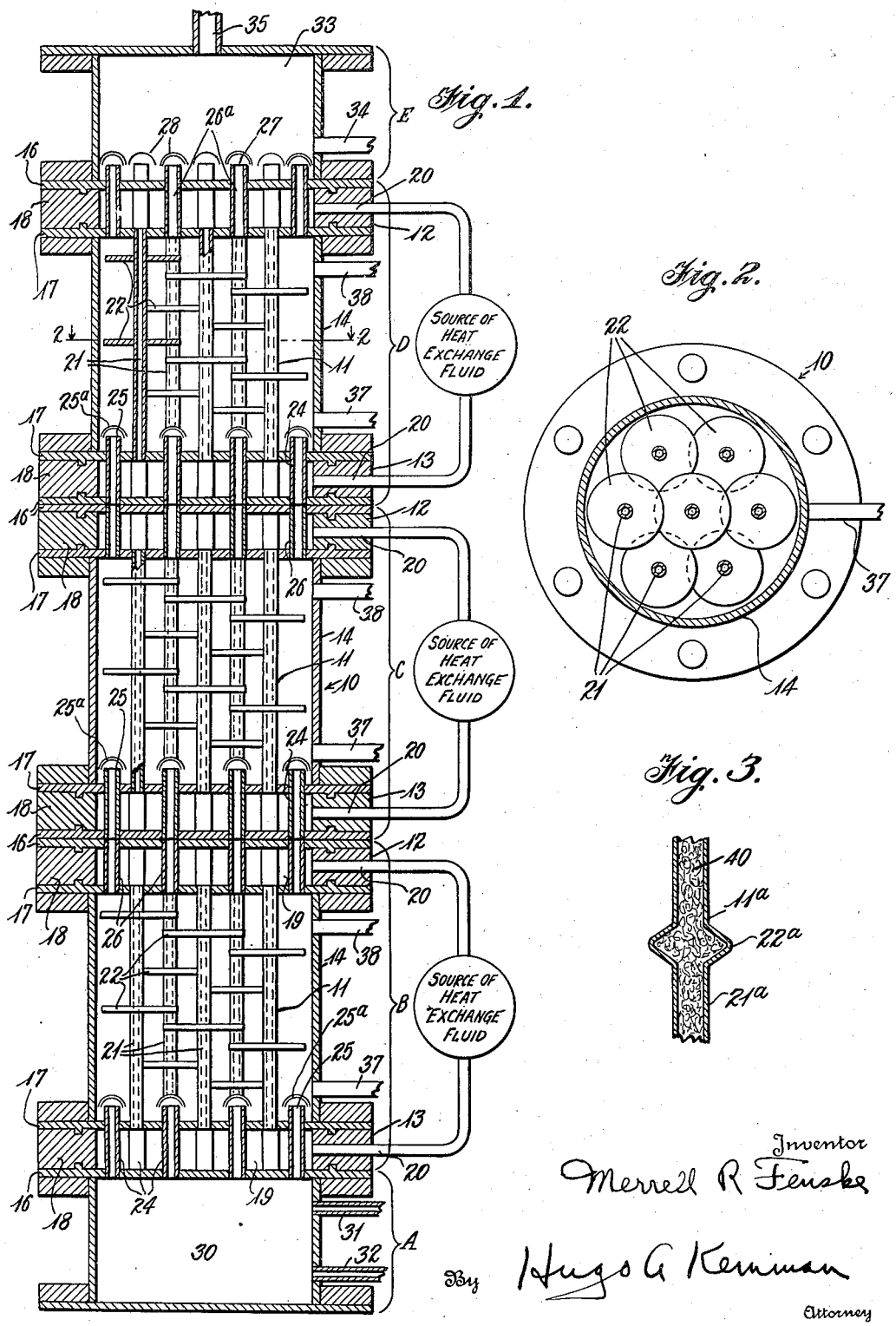

2,132,150

UNITED STATES PATENT OFFICE 2,132,150

APPARATUS FOR TREATING MINERAL OILS

Merrell R. Fenske, State College, Pa., assignor to Pennsylvania Petroleum Research Corporation, a corporation of Pennsylvania Application June 29, 1935, Serial No. 29,157

1 Claim. (Cl. 257—224)

This invention pertains generally to a method and apparatus for contacting liquid phases such as contacting lubricating oils with solvents and pertains particularly to a method and apparatus adapted for efficient heat exchange in the zone of contact.

In copending application, Serial No. 10,932, now Patent No. 2,037,318, by Merrell R. Fenske and Wilbert B. McCluer filed March 13, 1935 and in certain of the applications referred to therein there is described a method and apparatus for contacting liquid phases wherein said phases are caused to flow through the zone of contact over one or more longitudinally arranged attenuated packing members. These packing members may or may not be segregated from each other by being separately encased.

When the longitudinally arranged attenuated packing members are separately encased, the problem of heat exchange in the zone of contact may be solved by bringing the heat exchange fluid into contact with the outer surfaces of the separate encasements.

This, however, is not possible when said encasements are not employed. Since a tower of this character may have any desired number of longitudinally arranged attenuated packing members and consequently any diameter, the application of heat exchange fluids to the outer periphery of the tower is likely to cause a considerable heat gradient from said periphery toward the center of the tower.

To overcome these difficulties and in accordance with this invention said unencased longitudinally arranged attenuated packing members are made tubular to form channels for heat exchange fluid. By this means each attenuated packing member is not only employed for contacting the phases flowing over its exterior but also for the flow of heat to or from said phases. This is thought to set up eddy currents at the outer surfaces of the packing members due to the transfer of energy, thus increasing the efficiency of contact of the phases flowing over said surfaces.

Further features of the invention reside in the construction, arrangement and combination of parts, and in the steps, combinations of steps and sequences of steps all of which, together with other features, will become more apparent to persons skilled in the art as the specification proceeds and upon reference to the drawing in which:

Figure 1 is a sectional elevation illustrating one form of the invention;

Figure 2 is a section on line 2—2 of Figure 1; and

Figure 3 is a sectional elevation (shown broken) illustrating a different form of attenuated packing member.

Referring now more particularly to Figure 1, tower 10 will be referred to for convenience in description as being comprised of sections A, B, C, D, and E.

Section B is illustrated as comprising a plurality of tubular attenuated packing members 11 communicating at opposite ends with headers 12 and 13 respectively, and a shell 14 extending between headers 12 and 13 and enclosing said packing members 11.

Each header is illustrated as comprising spaced plates 16 and 17 between the outer peripheries of which is interposed a ring 18 to form a chamber 19 with which communication is had through a tube 20.

Each attenuated packing member 11 is illustrated as comprising a tube 21 and a plurality of spaced protuberances 22. Each tube 21 has its opposite ends connected with chambers 19 of headers 12 and 13 respectively and is secured in the respective plates 17 of said headers.

Tubes 21 may have any desired length and protuberances 22 may be of any desired number, a limited number of each being shown merely for the purposes of illustration.

Protuberances 22 on each attenuated packing member may be alternately spaced with respect to and overlap the protuberances on adjacent attenuated packing members so that any drops leaving any protuberance will at once contact another protuberance further downstream and so that the phases will be caused to flow through a circuitous course through the tower.

Protuberances 22, although illustrated as discs, may have any other desired or suitable configuration such as spheres, frustums of cones, frustums of double cones, rain drop shapes, or any other surface of revolution, and tubular rods 21 may be of any geometrical cross section.

The capacity of tower 10 is increased and decreased by increasing and decreasing the number of packing members 11, the periphery of the tower being adjusted to conform thereto.

Extending through plates 16 and 17 of header 13 and interspersed between packing members 11 are a plurality of tubes 24 which are illustrated as being flush with plate 16 but as extending above plate 17.

The upper edges 25 of tubes 24 are preferably in a horizontal plane and may be provided with caps 25a, the purposes of which will hereinafter appear.

If desired tubes 24 might also extend below the lowermost plate 16 and be likewise provided with caps.

Extending between plates 16 and 17 of header 12 and interspersed between packing members 11 are a plurality of tubes 26 which are illustrated as being flush with plates 16 and 17 although, if desired, tubes 26 may extend down from plate 17 and be provided with caps. The tubes 26 are in alignment with the tubes 24 of the adjacent section.

Section C is identical in construction with section B as is section D except that in the latter section tubes 26a extend above plate 16 of header 12, have their upper edges 27 preferably in a horizontal plane and are preferably provided with caps 28.

Section A comprises a feeding and segregating chamber 30 having an upper inlet 31 and a lower outlet 32.

Section E comprises a feeding and segregating chamber 33 having a lower inlet 34 and an upper outlet 35.

Heat exchange fluid may be circulated through the tubes 21 of any section B, C, or D by connecting the tubes 20 of that section to a suitable source of heat exchange fluid.

The purpose of showing a plurality of heat exchange sections in the drawing is to illustrate means for holding different parts of tower 10 at different temperatures. If a single temperature is desired it is obvious that only one contacting section will be necessary and that it is merely necessary to add an additional contacting section for each additional different temperature desired.

If desired, sections B, C, and/or D may be provided with means for feeding liquid into or withdrawing liquid from said sections, for instance, as illustrated at 37 and at 38.

For the purposes of clearness a limited number of attenuated packing members has been shown in the drawing with the volume of free space fairly large compared to the surface area of the packing. It is to be understood, however, that the attenuated packing members may be as densely grouped as desired and may be provided with any desired number of protuberances.

It has been observed that wetting of the packing member or members by one and perhaps in some cases a plurality of phases plays an important part in the efficiency of contact and the prevention of channeling. The packing members appear to act as guiding elements for at least one phase (and possibly more) as it flows through the tower keeping said phase distributed laterally of its flow.

The wetting feature makes it possible to disperse the wetting phase (or phases) by virtue of its spreading out into films on the surface of the packing member or members. It has been observed that these films in some cases collect in drops at points on the packing and become detached only to recontact the packing and spread out into films again. This kneading action, when present, assists in bringing the phase particles to the surface for contact.

If desired, the surfaces of the attenuated packing members might be alternated in character so as to be wetted first by one phase and then by another as described and claimed in my copending application, Serial No. 29,159, filed June 29, 1935.

Tower 10 may be operated in any desired manner. Examples of modes of operation are as follows:

(1) Simple countercurrent contact. In this case the heavier liquid is fed into chamber 33 through inlet 34. This liquid collects about the upper ends of tubes 26a and overflows edges 27. This overflow will be uniform if edges 27 are in a horizontal plane thus distributing the heavier liquid laterally of tower 10.

The lighter liquid is fed into chamber 30 through inlet 31, and due to the difference in density flows up through tubes 24 of section B. Due to the tendency of the lighter liquid to form a layer underneath plate 16 of header 13 of section B, this liquid is distributed laterally of section B.

The heavier phase is redistributed at each plate 17 as it descends through the tower and the lighter phase is redistributed at each plate 17 as it ascends through the tower.

The two phases contact each other while flowing about the attenuated packing members 11 which guide the phases and particularly the preferentially wetting phase in a manner to prevent serious channeling.

The heavier phase is separated in chamber 30 by layer formation and is withdrawn at 32. The lighter phase is separated in chamber 33 and is withdrawn at 35.

The desired temperature or temperatures in the zone of contact are maintained by flowing a heat exchange fluid such as steam, water or brine through the attenuated packing members.

(2) Counterflow of two immiscible or only partially miscible treating liquids with the introduction of the liquid under treatment intermediate the counterflow. In this case the counterflowing treating liquids will be distributed in the usual way and the liquid under treatment which may be introduced into the tower through any of the openings 37 or 38 will also be distributed laterally of the tower at plates 17. The temperature may be regulated as already described. The liquid under treatment may be introduced as such, or as a solution in a suitable solvent.

(3) Counterflow of the liquid under treatment against two treating liquids introduced into the tower at different points. In this case the liquid under treatment is introduced into the tower at one end, one of the treating liquids at the other end, and the other treating liquid or liquids at one or more intermediate points; for instance, through an opening or openings 37 and/or 38. The temperature may be regulated as already described.

(4) Simple counterflow with a reduction in solvent capacity in the direction of solvent flow to set up reflux conditions. This may be accomplished by reducing the operating temperature of the tower in the direction of solvent flow. For this purpose the various sections B, C, D, etc. may be operated at different temperatures. The reduction in solvent capacity in the direction of solvent flow might be accomplished by other means in addition to the maintenance of a temperature gradient along the tower.

(5) Counterflowing a solution comprising the treating liquid or liquids and the liquid under treatment and a precipitate comprising chiefly liquid under treatment. Precipitation of liquid under treatment from the solution may be effected by reducing the operating temperature of the tower in the direction of solution flow, with or without other means.

In this mode of operation the efficiency of the treatment is increased if the solution is maintained in an unsaturated condition at its entrance into the zone of contact. Such conditions may be set up by operating the tower at the solution entrance at a temperature sufficiently high to maintain the solution unsaturated at this point.

(6) Unidirectional flow through the tower. In this case all of the liquids flow in the same direction through the tower. If all of the liquids are in solution, reduction in temperature may be resorted to to cause the formation of two phases.

(7) In this mode of operation one liquid may flow longitudinally of the tower and the other laterally of the tower at any desired angle with respect to said first liquid, for instance by introducing and withdrawing the second liquid through openings similar to openings 37 and 38, the withdrawal being made possible by the formation of layers on the plates 17.

Tower 10 may be operated in any other manner, the specific examples being set forth for the purposes of illustration.

The attenuated packing members 11 may be constructed in any other desired manner.

For instance, in Figure 3 tube 21a and protuberance 22a are both of a hollow construction.

Any other suitable variation may be adopted.

While the invention has been described in connection with a tower for the contact of liquid phases, it is to be understood that it may be employed for any other purpose wherein the exchange of heat is desired, the outer surfaces of attenuated packing members 11 and their arrangement with respect to each other making it possible to intimately contact the fluid (whether liquid or gaseous) in contact therewith.

Should it be desired to increase the rate of heat exchange between the attenuated packing members 11 and the fluid which flows through the tubes 21, tubes 21 might be packed with any suitable packing material and the packing elements might be joined together and/or to the tube walls as described and claimed in copending application, Serial No. 29,160, filed June 29, 1935. Surface films are thus eliminated between the parts.

Packing elements may be joined together and/or to the tube walls by raising the temperature to the fusion point preferably without an inordinate change in shape. This applies particularly to glass.

The parts might also be joined together, particularly when metallic, by coating the surfaces with a lower melting metal or alloy, placing the parts in position, and then raising the temperature to the fusion point of the coating.

The packing elements might also be joined together and/or to the tube wall when the parts are metallic by fusing a lower melting metal or alloy and flowing the same through the tube after the packing is in place, being careful not to deposit an inordinate amount of metal so as not to cause a too large reduction in free space.

The attenuated packing member 11a of Figure 3 is illustrated as having its interior packed with packing 40.

The construction shown in the drawing may also be employed in conjunction with the usual loose packing such as raschig rings, jack chain, etc. which might fill the spaces between the tubes 21 and the protuberances 22. This would not only improve phase contact but would also afford a means for rapid heat exchange with the loose type of packing. Such packing might, if desired, be joined together and/or to the outer surface of tubes 21 and protuberances 22, for instance by the means suggested above.

Many other variations are possible.

While structure has been particularly described, it is to be understood that this is by way of illustration. Therefore, changes, omissions, additions, substitutions and/or modifications might be made within the scope of the claim without departing from the spirit of the invention.

I claim:

Apparatus comprising, a column having a plurality of super-imposed serially connected liquid phase contacting sections, a plurality of spaced attenuated packing members vertically arranged in each section, a liquid phase feeding and separating chamber at the top of said column, a liquid phase feeding and separating chamber at the bottom of said column, means in each of said chambers for distributing the feed liquid laterally of said tower, means intermediate said sections for distributing said liquid phases laterally of said tower, longitudinally arranged heat exchange channels through the interiors of the attenuated packing members of each section, and means for flowing a heat exchange fluid through the channels of each section, said last-mentioned means for each section being independent of similar means for the other sections.

MERRELL R. FENSKE.